United States Patent [19]
Sasada

[11] Patent Number: 5,411,151
[45] Date of Patent: May 2, 1995

[54] AUTOMATIC DISTRIBUTION CENTER SYSTEM

[75] Inventor: Yasuhiro Sasada, Ibaraki, Japan

[73] Assignee: Hitachi, Ltd., Tokyo, Japan

[21] Appl. No.: 162,283

[22] Filed: Dec. 7, 1993

[30] Foreign Application Priority Data

Dec. 14, 1992 [JP] Japan ................................. 4-332700

[51] Int. Cl.6 ............................................... B07C 5/00
[52] U.S. Cl. ..................................... 209/583; 209/912; 414/331
[58] Field of Search ............... 209/583, 559, 563, 564, 209/565, 576, 912, 569, 567; 414/273, 286, 281, 282, 283, 331, 285

[56] References Cited

U.S. PATENT DOCUMENTS

| | | | |
|---|---|---|---|
| 4,250,028 | 2/1981 | Talyzin et al. | 209/583 |
| 4,621,745 | 11/1986 | Grace | 414/285 |
| 4,622,875 | 11/1986 | Enery et al. | 209/583 |
| 4,932,828 | 6/1990 | Katae et al. | 414/331 |

FOREIGN PATENT DOCUMENTS

| | | | |
|---|---|---|---|
| 227569 | 7/1987 | European Pat. Off. | 209/583 |
| 171904 | 9/1985 | Japan | 414/331 |

Primary Examiner—Kenneth W. Noland
Attorney, Agent, or Firm—Antonelli, Terry, Stout & Kraus

[57] ABSTRACT

There is provided a fully automatic distribution center system capable of preventing mistakes made in distribution caused by human error. The system includes facilities which, after articles to be distributed are brought into the distribution center are conveyed to a storage area, permit the following series of operations to be performed automatically: Sorting of the articles until they are conveyed to a shipping area, storing in various packing styles of the cargoes, arranging of the cargoes, packing, palletizing, and the like. These facilities free workers from the task of handling the articles to be distributed during the usual operation of the center.

3 Claims, 4 Drawing Sheets

AUTOMATIC DISTRIBUTION CENTER SYSTEM

BACKGROUND OF THE INVENTION

1. Field of the Invention

The present invention relates to an automatic distribution center system for distributing articles, more specifically to an automatic distribution center system suitable for frequently handling a relatively wide variety of articles, in large amounts.

2. Description of the Prior Art

Conventional automatic distribution center to systems for distributing articles have been designed to reduce the workload of workers by the introduction of various automatic machines, but a large portion of the distributing and handling operations is still performed manually, so that there remains the problem of mistakes in distribution, which occur due to human error.

SUMMARY OF THE INVENTION

It is the object of the invention to provide an automatic distribution center system capable of preventing from occurring mistakes in distribution due to human error.

According to the present invention, a distribution center is provided which is capable of accepting small orders for handling a minimum unit amount of articles to be distributed and sorted in accordance with their shipping destination. The center is provided with facilities which, after the articles which have been brought into the center are conveyed to a storage area, automatically sore the articles until they are conveyed to a shipping area, store them in various package style, sort cargo, pack them, and places them on pallets. These automatic operations free workers from handling articles for distribution during the usual operation of the center, thereby eliminating mistakes made in distribution caused by human error.

DESCRIPTION OF THE PREFERRED EMBODIMENTS

One embodiment of the present invention will be described with reference to FIGS. 1 through 3. Each figure is a block diagram or a schematic view showing the arrangement of the facilities of and article flow in an automatic distribution center, wherein small orders for distributing relatively small articles of a minimum unit amount can be accepted, and the articles can be sorted in accordance with their destination, after which they are distributed.

Figure 1:
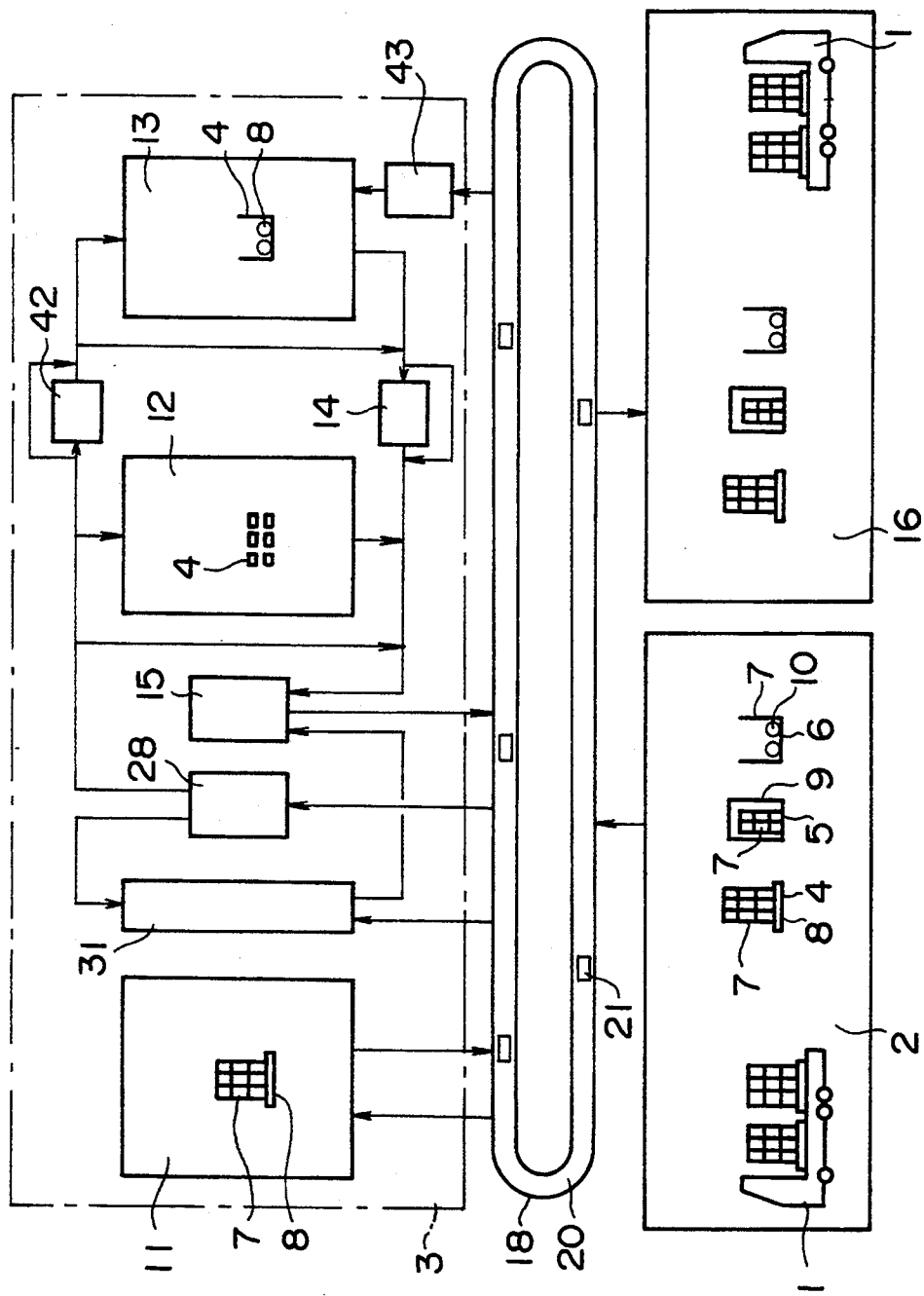
FIG. 1 is a block diagram showing the arrangement of the facilities of and article flow in an automatic distribution center in accordance with one embodiment of the invention.

Referring to FIG. 1, the packages and the like which have been brought into the distribution center by a truck 1 is unloaded at a place for unloading 2, after which the arrived packages are inspected and sent to storage/sorting area 3. Articles which have arrived at the distribution center are sorted according to how they are packed, that is as pallet cargo 4, case cargo 5, or bulk cargo 6. The pallet cargo 4 consists of a plurality of articles contained in a case 7, loaded on pallet 8 formed into a flat board, the case cargo 5 consists of a plurality of articles contained in the case 7, put together in a box-shaped pallet 9, and the bulk cargo 6 consists of a plurality of articles 10 which are put in the opened case 7, all of which are cargo containing a relatively small number of articles.

At the storage/sorting area 3, there are provided a pallet-type automatic storage 11 in which the case 7 containing a plurality of articles is loaded onto the pallet 8 formed into a flat board for storage and automatically taken out in accordance with requests for taking out articles; a case picking apparatus 12 in which the case 7 containing a plurality of articles is each stored in case units and taken out in case units in accordance with orders made; and a piece picking apparatus 13 in which a plurality of articles 10 is each put into the opened case 7 for storage and taken out in the smallest handling unit in accordance with orders made. The articles loaded on the pallet, those contained in the cases, and the individual article can be automatically taken out upon orders made. After the articles which have been taken out are packed using a packing machine 14, a palletizer 15, and the like, they go through a delivery inspection and are then transported by the truck 1 from the shipping area 16. The outline of the distribution center is as described above. Each portion will be described in detail below with reference to FIG. 2.

Figure 2:
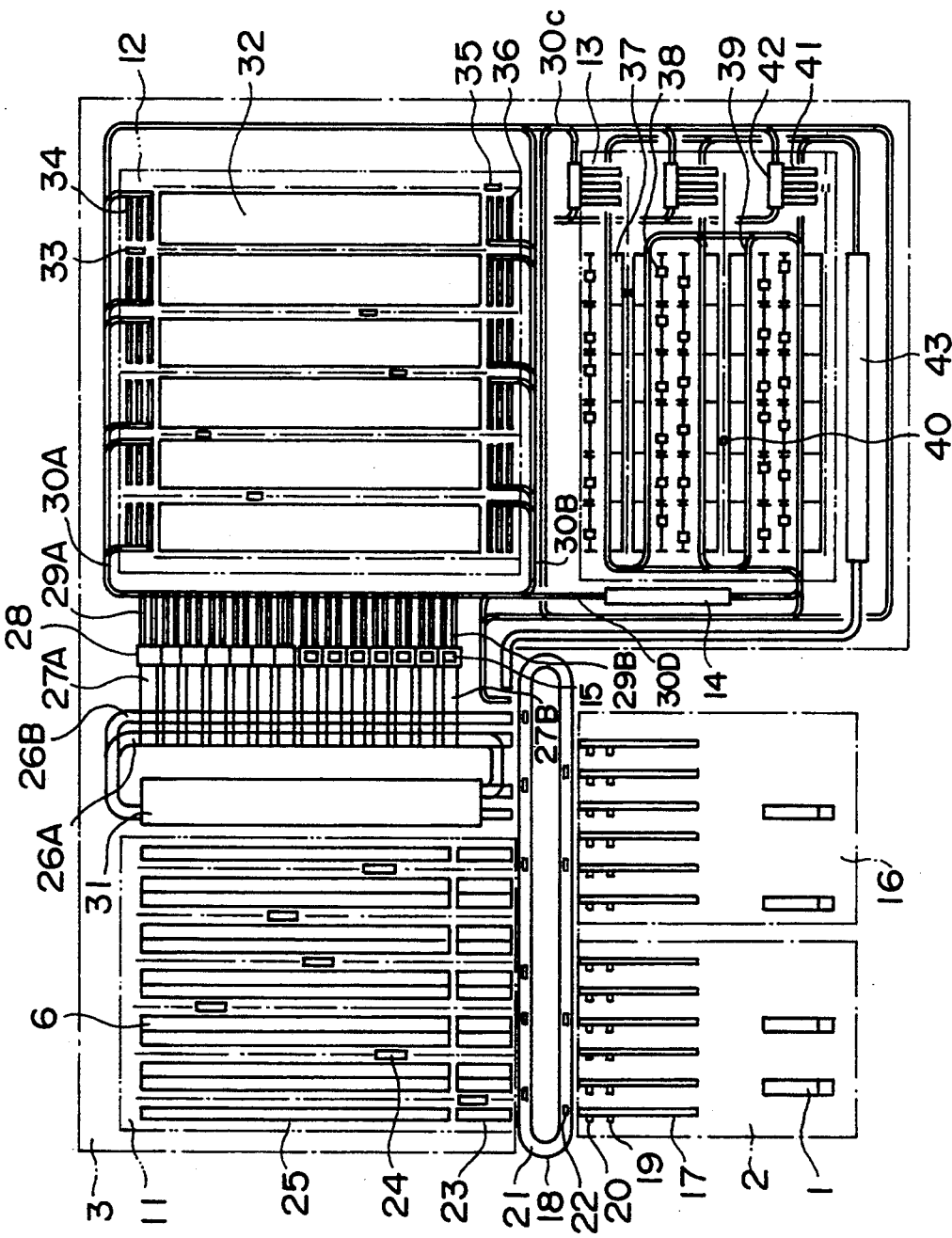
FIG. 2 is a schematic view of the facilities showing their arrangement and article flow in an automatic distribution center in accordance with one embodiment of the invention.

Referring to FIG. 2, a truck driver who has transported the cargo to the place of unloading 2 cooperates with workers at the place of unloading and unloads the cargo from the truck 1. The cargo goes through a delivery inspection while part or all of the cargo is on a transfer port 17. The transfer port 17 serves as a starting point for the movement of a transfer device 18 to the storage/sorting area 3, from where the sequence of operations such as conveying articles to the storage/sorting area 3, sorting within the storage/sorting area 3, storing in various package styles, sorting cargo, packing, and palletizing, and conveying articles to the shipping area 16 are carried out. For these operations, there are provided automatically operable facilities, by which, during the usual operation of the center, the workers are freed from the task of handling articles to be distributed.

The transfer port 17 is provided with an automatic reader which identifies the articles which have been brought in and compares the identified articles to information related to arrived cargo, after which the destination of the articles is instructed to the transfer device 18. With reference to the articles which arises trouble in identifying of the automatic reader 19, an identification mark indicator 20 gives additional identifying marks thereon, so that no interference occurs in the automatic operation within the distribution center. The transfer device 18 has a loop-shaped track 21 and a plurality of carriages 22 (ten illustrated), which move at a high speed, connecting a large area covering the unloading/shipping area 2, 16 and the storage/sorting area 3.

The articles which come in relatively large amounts are frequently loaded on the pallet 8 and stored in the pallet-type automatic storage 11. The article which have been transferred to a pallet storage shelf 25 by way of a conveyor 23 for putting in and taking out articles from the storage and stacker crane 24 (six illustrated) from the carriage 22 are, in accordance with requirements of shipping the articles, shipped from the shipping area 16 passing in reverse order the routes which the arrived articles took in the package style during storage. In addition, they are sent to a depalletizer 28 (seven illustrated) by way of a pallet cargo transfer conveyor 26A and a pallet cargo feed conveyor 27A and sorted and put in the case 7 and on the plate pallet 8 respectively. Each case 7 is then sent to either a case picking device 12 or a piece picking device 13 by way of a case storage conveyor 29A or a case transfer conveyor 30A, and the plate pallet 8 formed into a thin board once again travels on the pallet cargo feed conveyor 27A and the pallet cargo transfer conveyor 26A to be sent to a pallet storage feed/device 31.

The case picking device 12 includes a flow rack 32, a device 33 for putting the cases into the storage (three illustrated), a port 34 for sending the cases into the storage, a device 35 for taking out the cases from the storage (four illustrated), and a port 36 for passing the cases out of the storage. After travelling on the case transfer conveyor 30A and passing the port 34 for sending cases into the storage and the device 13 for putting in the cases in the storage, each case 7 which has been stored in the flow rack 32, in accordance with the requirement of taking out the cases from the storage, passes the device 35 for taking out the cases from the storage and the port 36 for passing the cases out of the storage, and travels on a case transfer conveyor 30B and a case storage conveyor 29B in order to be sent to the palletizer 15, or further travels on the case transfer conveyor 30A and a case transfer conveyor 30C in order to be sent out to the piece picking device 13.

The piece picking device 13 includes a bulk cargo storage shelf 37, a picking robot 38 (thirty illustrated), a picking case conveyor 39, a bulk cargo replenisher 40 (thirty illustrated), and a bulk cargo replenishing port 41, and has, as peripheral devices, a case packer 14, a case packing opener 42, and a picking case storage/supplying device 43. After travelling on the case transfer conveyor 30 and entering the case packing opener 42, each case 7 is opened and pass the bulk cargo replenishing port 41 and the bulk cargo replenisher 40 to be stored on each bulk cargo storage shelf 37.

In the bulk cargo replenisher 40 and the picking robot 38 located opposite thereto with the bulk cargo storage shelf 37 put between them, each article 10 is taken out from each opened case 7 stored in each bulk cargo storage shelf 37 and is put into the picking case on the picking case conveyor 39, in accordance with requirements of taking out the cases from the storage. The picking case is assembled with the picking case storage/supplying device 43 and is supplied onto the picking case conveyor 39, after which it moves in front of the bulk cargo storage shelf 37 containing the articles to be picked. Then, each article 10 is gathered and packed by means of the case packer 14. After travelling on a case transfer conveyor 30D, the case transfer conveyor 30B, and the case storage conveyor 29B, the cases are sent to the palletizer 15.

At the palletizer 15, the cases 7 are sent from the case picking device 12 and the case packer 14, and are sorted on the case storage conveyor 29B in accordance with their destination, after which each lined-up case 7 is loaded on the plate pallet 8 or the box-shaped pallet 9. After travelling on the pallet cargo transfer conveyor 26A and a pallet cargo feed conveyor 27B from the pallet storage/feed device 31, the pallet 8 and the box-shaped pallet 9 are supplied. After being loaded into the cases, the pallet cargo 4 travels on the pallet cargo feed conveyor 27B and the the pallet cargo transfer conveyor 26B, and passes the transfer device 18 in order to be sent to the shipping area 16.

At the shipping area 16, while each article 10 to be shipped passes past the transfer port 17 the identifying mark indicator 20 clearly indicates each destination, and the automatic reader 19 controls the shipment, loading each article on the truck 1.

Figure 3:
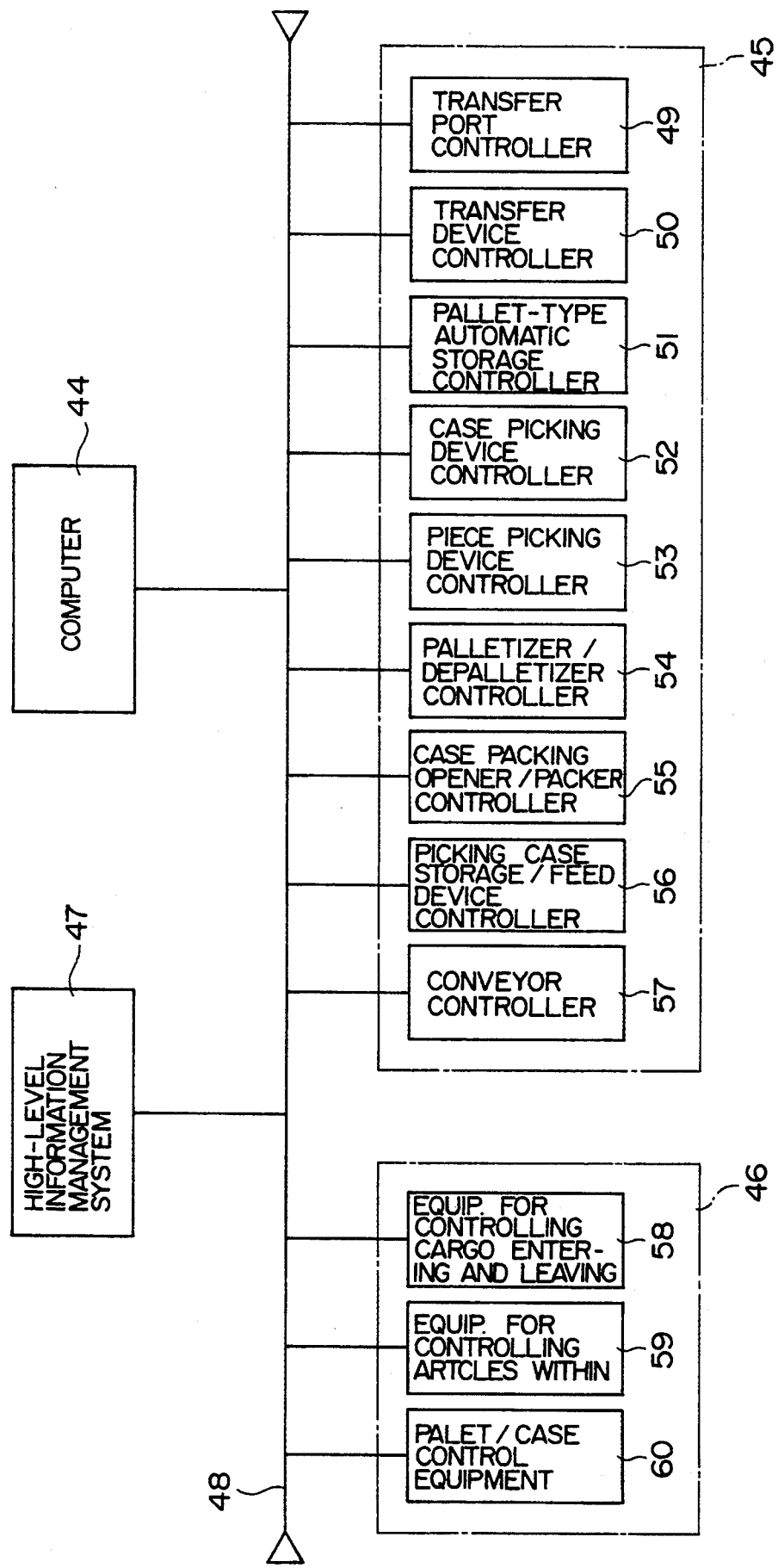
FIG. 3 is a block diagram generally showing a control system of the automatic distribution center in accordance with one embodiment of the invention.

FIG. 3 is a block diagram of the control system in the distribution center.

The control system of the distribution center is divided into a computer 44 for controlling the distribution center system, a mechanical system control equipment 45, and a data control equipment 46, each of which are mutually connected to one another and are also connected to the high-level information management system 47 by LAN (Local Area Network). The mechanical system control equipment 45 includes a transfer port controller 49, a transfer device controller 50, a pallet-type automatic storage controller 51, a case picking device controller 52, a piece picking device controller 53, a palletizer/depalletizer controller 54, a case packing opener/packer controller 55, a picking case storage/feed device controller 56, and a conveyor controller 57. The information management equipment 46 includes equipment 58 for controlling cargo entering and leaving the storage, equipment 59 for controlling articles within the center, and a pallet/case control equipment 60, each of which cooperates with the controller 44 for controlling the distribution center system and the high-level information management system 44, whereby the distribution center system is supported so as to operate normally.

In the present embodiment, the palletizer 15 and the depalletizer 28, and the transfer port 17 in the unloading area 2 and the transfer port 17 in the shipping area 16, have their facilities arranged respectively in the same way, so that if one of the loads reaches its peak the load can be equalized by using the other facility.

Figure 4:
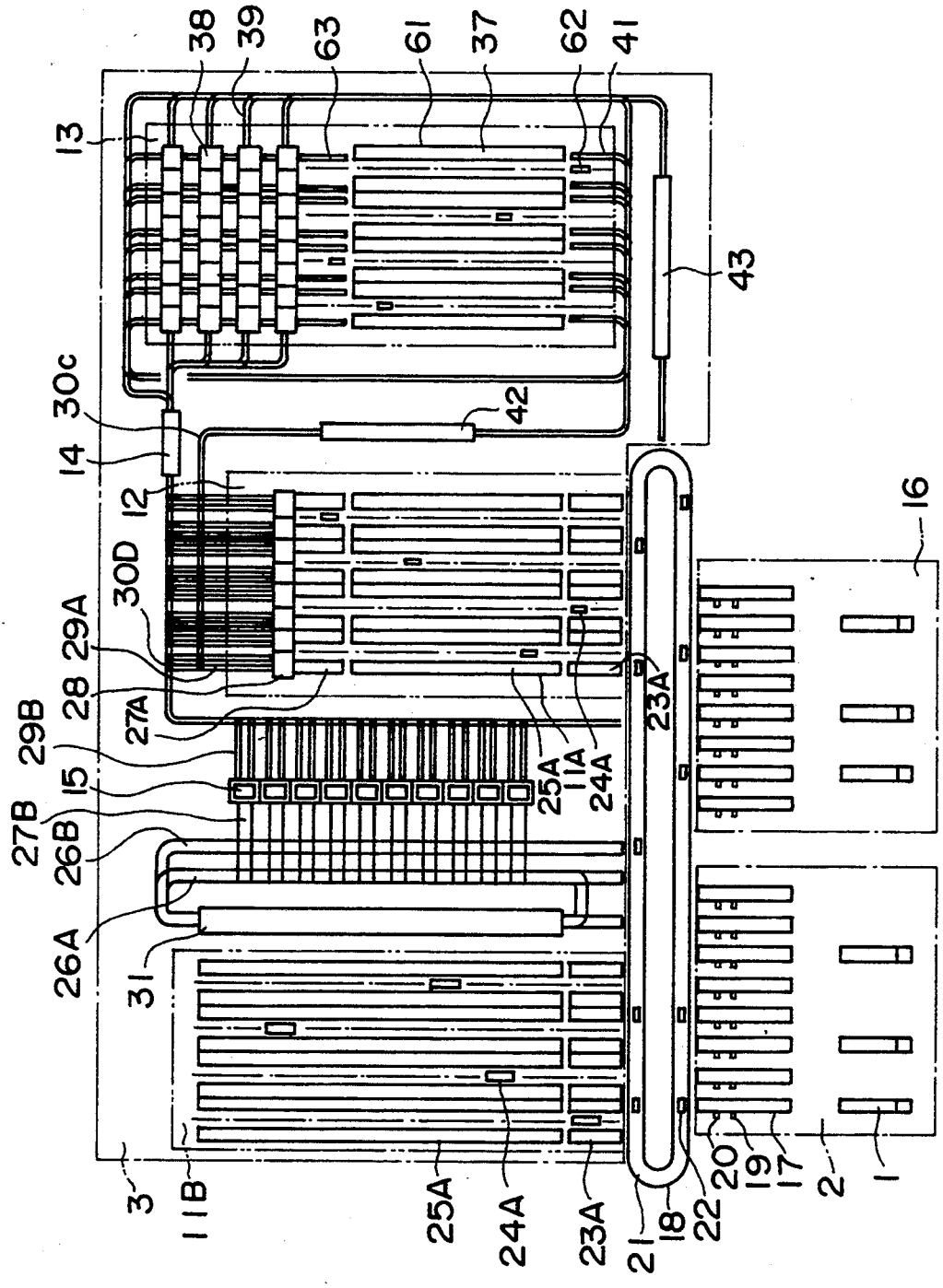
FIG. 4 is a schematic view showing the arrangement of the facilities of and article flow in the automatic distribution center in accordance with another embodiment of the invention.

FIG. 4 represents another embodiment of the present invention. FIG. 4 is divided into two groups such as pallet-type automatic storage 11A and 11B, and shows a schematic view of the facilities of the automatic distribution center in which the pallet-type automatic storage 11A and the palletizer 28 are assembled together to form a case picking device 12, or an opened-case type automatic storage (bucket-type automatic storage) 61 and the picking robot 38 are assembled together to form the piece picking device 13. An embodiment of the case picking device 12 and the piece picking device 13 different from that in FIG. 2 will be hereunder described.

The case picking device 12 includes a pallet-type automatic storage 11A having stacker crane 24A (four illustrated), a pallet cargo storage shelf 25A, and a conveyor 23A for putting in and taking out the pallets from the storage, a depalletizer 28, and a pallet cargo feed conveyor 27A, and a case storage conveyor 29A. After passing a conveying device 18 and travelling on the conveyor 23A for putting in and taking out pallets from the storage and the stacker crane 24A, the pallet cargo 4 stored in the pallet cargo storage shelf 25A is transported to the depalletizer 28 by the pallet cargo feed conveyor 27A in accordance with requirement of shipping the pallets from the storage. The required case 7 is then transferred on the case storage conveyor 29A. After being transferred, the pallet cargo 4 is once again stored in the pallet cargo storage shelf 25A. The case 7 which has been transferred on the case storage conveyor 29A is transported to the palletizer 15 by way of the case transfer conveyor 30B and the case storage conveyor 29B, or transported to the piece picking device 13 by way of a case transfer conveyor 30C and a case packing opener 42.

The piece picking device 13 includes a case-type stacker crane 62 (four illustrated), the opened case-type automatic storage 61 having the bulk cargo storage shelf 37 and the bulk cargo feed port 41, the picking robot 38 (thirty-two illustrated), a bulk cargo conveyor 63, and a picking case conveyor 39. The case 7 opened by the case packing opener 42 is stored in the bulk cargo storage shelf 37 by way of the bulk cargo feed port 41 and the case-type stacker crane 62, and transported to the picking robot 38 by the bulk cargo conveyor 63 in accordance with requirements for taking out the cases from the storage. The picking robot 38 is provided with the picking case conveyor 39 which intersects the bulk cargo conveyor 63, and transports the required articles from the opened case placed on the bulk cargo conveyor 63 to the picking case placed on the picking case conveyor 39. After transferring, the opened cases are once again stored in the bulk cargo storage shelf 37. The picking case which has received the articles are sent differently according to the shipping package style to the shipping area 16, and the pallet cargo and the case cargo are packed by the case packer 14 and then sent thereto by way of the palletizer 15, and the bulk cargo are sent directly to the shipping area 16.

What is claimed is:

1. An automatic distribution center system including an unloading place for unloading articles of cargo transported into a distribution center, a storage/sorting area for sorting and storing the transported articles of cargo according to how the articles are packed, a shipping area for shipping the articles sorted in accordance with their destination from the distribution center, and a transfer apparatus for transferring the articles from the unloading place to the storage/sorting area or from the storage/sorting area to the shipping area, so that the articles are distributed from the unloading place to the shipping area by automatically sorting the articles in accordance with their destination, the system comprising a pallet-type automatic storage/supply apparatus provided in the storage/sorting area for loading and storing case cargo containing the articles on pallets and performing automatically a taking-out operation in accordance with requests for taking-out the articles, a case picking apparatus for storing cases containing a plurality of the articles each in case units and taking out in case units in accordance with requests for taking-out the articles, and a piece picking apparatus for storing articles each put into opened cases and taking out the articles in the smallest handling unit in accordance with requests for taking-out the articles, whereby the articles loaded on a pallet, the articles contained in cases and an individual article are automatically taken out in accordance with requests for taking-out the articles, and the taken-out articles are packed and palletized using a case packing machine and a palletizer so as to distribute the articles from the shipping area in accordance with their destination.

2. An automatic distribution center system according to claim 1, further comprising a transfer port provided in the unloading place and in the shipping area, and an automatic reader and an identification mark indicator provided in said transfer port for identifying articles which have been brought in and for comparing the identified articles to information related to arrived articles of cargo so as to instruct their destination to the transfer apparatus, said identification mark indicator providing additional identifying marks with respect to the articles which the automatic reader may have difficulty in identification thereof so as to avoid interference in the automatic operation within the distribution center, said transfer apparatus having a loop-like railway for connecting the unloading place, the storage/sorting area and the shipping area to each other, the transfer port of the unloading area and the transfer port of the shipping area having the same function, and when a load in one of the transfer ports of the unloading place and the shipping area reaches its peak, the load being designed to be equalized using another transfer port.

3. An automatic distribution center system including an unloading place for unloading articles of cargo transported into a distribution center, a storage/sorting area for sorting and storing the transported articles of cargo according to how the articles are packed, a shipping area for shipping the articles sorted in accordance with their destination from the distribution center, and a transfer apparatus for transferring the articles from the unloading place to the storage/sorting area or from the storage/sorting area to the shipping area, so that the articles are distributed from the unloading place to the shipping area by automatically sorting the articles in accordance with their destination, the system comprising a pallet-type automatic storage/supply apparatus provided in the storage/sorting area for loading and storing cases containing the articles on pallets and performing automatically a taking-out operation in accordance with requests for taking-out the articles, a case picking apparatus for storing cases containing a plurality of the articles each in case units and taking out in case units in accordance with requests for taking-out the articles, a piece picking apparatus for storing articles each put into opened cases and taking out the articles in the smallest handling unit in accordance with requests for taking-out the articles, thereby allowing articles transferred to the pallet-type automatic storage to be shipped from the shipping area by passing in a reverse order to a route which the arrived articles took in a package style in accordance with requirements for shipping the articles, and articles not shipped from the shipping area in an originally storing package style to be sent to a depalletizer through a load transfer conveyor and a pallet-load supply conveyor to separate the articles to an individual case and a pallet, so that the individual cases are sent to the case picking apparatus or the piece picking apparatus by way of a case storing conveyor and a case transfer conveyor, and the pallet is sent again to the pallet storage/supply apparatus through the pallet-load supply conveyor and the pallet-load transfer conveyor.

* * * * *